United States Patent [19]

Maebara et al.

[11] 4,342,441

[45] Aug. 3, 1982

[54] CORE FOR USE IN CASTING HOLLOW CONCRETE SLAB AND METHOD OF CASTING SUCH SLAB

[75] Inventors: Isao Maebara; Koichiro Fujio, both of Tokyo, Japan

[73] Assignee: Ishikawajima-Kenzai Kogyo Co., Ltd., Japan

[21] Appl. No.: 163,559

[22] Filed: Jun. 27, 1980

[30] Foreign Application Priority Data

Jun. 29, 1979 [JP] Japan ................................ 54-82478

[51] Int. Cl.³ ............................ B29C 1/12; B28B 7/32

[52] U.S. Cl. .................................... 249/65; 249/66 R; 249/175; 249/178; 264/314; 425/417

[58] Field of Search .................... 249/65, 36, 175, 177, 249/178; 264/314; 206/86; 425/417

[56] References Cited

U.S. PATENT DOCUMENTS

| | | | |
|---|---|---|---|
| 1,456,058 | 5/1923 | Hale | 249/65 |
| 1,605,782 | 11/1926 | Rota | 249/65 |
| 2,623,261 | 12/1952 | Semeraro | 249/65 |
| 2,892,339 | 6/1959 | Flower et al. | 249/65 |
| 2,949,658 | 8/1960 | Conn | 249/65 |
| 2,977,658 | 4/1961 | Smith et al. | 249/65 |
| 3,104,441 | 9/1963 | Smith | 249/65 |
| 3,306,568 | 2/1967 | Baber | 249/65 |
| 4,011,946 | 3/1977 | Savage et al. | 206/806 |

FOREIGN PATENT DOCUMENTS

| | | | |
|---|---|---|---|
| 2734657 | 2/1979 | Fed. Rep. of Germany | 206/806 |
| 570355 | 3/1959 | Italy | 249/65 |
| 505837 | 5/1939 | United Kingdom | 249/65 |

*Primary Examiner*—Willard E. Hoag

*Attorney, Agent, or Firm*—William A. Drucker

[57] ABSTRACT

There is disclosed a core for use in casting a long concrete slab for forming a continuous hole extending along its length. The core comprises a relatively rigid, resilient elongated hollow body having closed opposite ends, and a contractible filling member made of an open-cell foamed material and filled in said hollow body. Also disclosed is a method of casting a long hollow concrete slab, using a core having the construction as aforesaid.

8 Claims, 5 Drawing Figures

CORE FOR USE IN CASTING HOLLOW CONCRETE SLAB AND METHOD OF CASTING SUCH SLAB

BACKGROUND OF THE INVENTION

1. Field of the Invention

This invention relates generally to a method of forming substantially long hollow concrete slabs having one or more continuous holes extending therethrough along the length thereof, and more particularly to a core for use in casting such slabs for forming such continuous holes.

2. Prior Art

Hollow concrete slabs have been extensively used in the construction of various kinds of structures including buildings, railway station platforms, express ways and the like because they are superior to the conventional non-hollow concrete slabs in structural strength, weight, production cost and so on. Because of these advantages, there has now been a great demand for such hollow concrete slabs. However, the casting of the hollow concrete slabs is far more complicated than that of the non-hollow concrete slabs and therefore requires advanced techniques. For this reason, such hollow concrete slabs have not been produced by the manufacturers in an amount enough to fully meet the increasing demand. The primary difficulty encountered in casting a long continuous hollow concrete slab has been the problem of providing an efficient core means for forming a continuous hole extending longitudinally through the concrete slab. None of the heretofore-proposed core means have been found entirely satisfactory. Typical examples of such conventional core means are as follows:

One such known core comprises a tubular body made, for example, of a tinplate, the tubular body being embedded in the cast concrete slab so that the bore of the tubular body defines a continuous hole extending longitudinally through the concrete slab. Thus, such core is designed to be permanently retained in the cast slab, and it is rather difficult to select the optimum material of which the core is to be made. Another disadvantage is that this procedure increases the overall manufacturing cost becaused of such added material. A further disadvantage is that where a long hollow slab is to be cast, it is quite difficult to place such a long core in position in a mold or casting bed. Thus, this conventional core has been found not entirely suited for use in casting a long hollow concrete slab.

Another conventional method of casting a long hollow concrete slab is known in which a hopper for feeding concrete into a horizontally-disposed mold is mounted above the mold for movement therealong. The hopper is provided with a core element which has a vertical portion extending downwardly from the hopper at its front and a horizontal portion extending rearwardly from the vertical portion beyond the opening of the hopper through which concrete to be cast is fed into the mold, the horizontal portion being disposed in the mold and serving to form a hole through the cast concrete. The hopper is advanced in a casting direction to pour concrete into the mold so that the horizontal portion of the core element is simultaneously moved to form a hole through the cast concrete. With this method, the horizontal portion of the core element is continuously moved through the cast concrete to form a continuous hole immediately after the concrete is cast into the mold. Therefore, the thus formed hole is susceptible to deformation or fracture. If the slump is kept small in order to overcome this difficulty, the bonding between the cast concrete and the associated longitudinal and lateral reinforcing bars would be adversely affected so that cracks may occur in the resultant concrete slab. Thus, this method has failed to provide a long hollow concrete slab of sufficient strength and durability.

A further conventional method of casting a hollow concrete slab employs a core of granular material to provide a continuous hole. In this method, a pair of first and second hoppers are mounted above a horizontal long casting bed for movement in unison therealong. The first hopper for extruding the granular material includes a core-forming element having opposite open ends, and feed means interconnecting the hopper and the core-forming element, the core-forming element being arranged to be disposed in the casting bed and beneath the second hopper. During the casting operation, the first hopper extrudes the granular material to the core-forming element through the feed means so that the granular material is compacted by the core-forming element to provide part of the core to be formed. The granular material extruded into the core-forming element is immediately compacted, and since the first and second hoppers are continuously moved in the casting direction, the core-forming element moves away from the thus compacted granular material immediately after it has been filled in the core-forming element. The second hopper is located rearwardly of the first hopper and pours concrete over the core-forming element to form a cast concrete slab. After the concrete slab is cured, the granular material embedded in the concrete slab and serving as the core is removed from the slab to provide a continuous hole extending longitudinally therethrough. With this method, however, difficulty has been encountered in properly compacting the granular material acting as the core. A further problem is that the so formed core can not be easily removed from the cast concrete slab. This difficulty arises from the fact that the core element naturally has a coarse surface because it is composed of the granular material. The coarse surface serves to enhance the binding of the cast concrete to the core. In addition, the coarse surface detracts from the appearance of the finished product and diminishes its quality. This is undesirable from a commercial point of view. Further, pressure air and the like are employed to remove the core of the granular material from the cast concrete slab. This procedure gives rise to substantial noises and dust. This is undesirable from an anti-pollutant point of view. For these reasons, this method has been found not wholly satisfactory.

SUMMARY OF THE INVENTION

It is therefore an object of this invention to provide a core for use in casting a long concrete slab having a continuous hole extending longitudinally therethrough, which core facilitates the formation of such hole.

Another object is to provide such a core which facilitates the removal of the same from the cast concrete slab and is capable of providing a continuous hole free of deformation through the concrete slab.

A further object is to provide such a core which is easy in manufacture and durable in construction.

According to one aspect of the invention, there is provided a core for use in casting a long concrete slab for forming a continuous hole extending along its length, which core comprises a relatively rigid, resilient elongated hollow body having closed opposite ends; and a contractible filling member made of an open-cell foamed material and filled in the hollow body.

According to another aspect of the invention, there is provided a method of casting a concrete slab having a continuous hole extending along its length, which method comprises the steps of placing a core in place in a mold, the core includes a relatively rigid, resilient elongated hollow body having closed opposite ends and an opening formed therethrough at one end thereof; and a contractible filling member made of an open-cell foamed material and filled in the hollow body; pouring concrete into the mold and allowing the concrete to set; applying a selected degree of negative pressure to the interior of the hollow body through the opening to contract the filling member together with the hollow body, with the cross section of the core reduced throughout the entire length thereof; withdrawing the thus contracted core from the cured concrete; and stripping the cured concrete from the mold.

Many other advantages and features of the present invention will become manifest to those versed in the art upon making reference to the detailed description and the accompanying drawings in which preferred embodiments incorporating the principles of the present invention are shown by way of example.

DETAILED DESCRIPTION OF THE PREFERRED EMBODIMENTS

Figure 1:
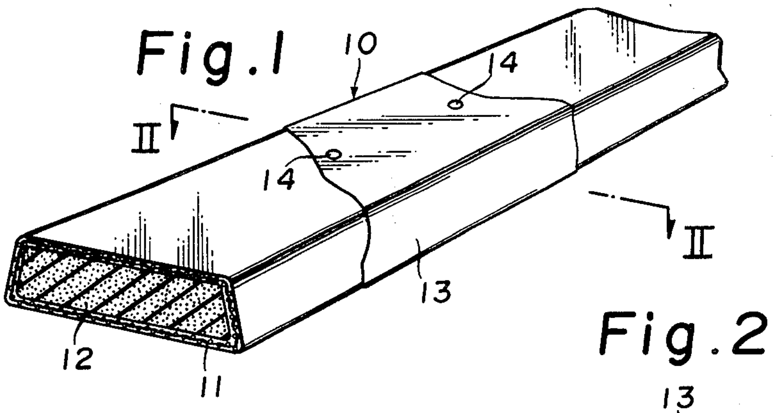
FIG. 1 is a fragmentary perspective view of a core provided in accordance with the present invention.

FIG. 1 shows a core construction generally designated at 10 which embodies the principles of the present invention. The core 10 includes a hollow body 11 of a trapezoidal cross-section which is composed of a ply of canvas. With this material, the core body 11 is relatively rigid but suitably resilient. The core body 11 may be made of any other suitable material so long as the body can possess similar properties. The core body 11 has opposite closed ends.

Figure 2:
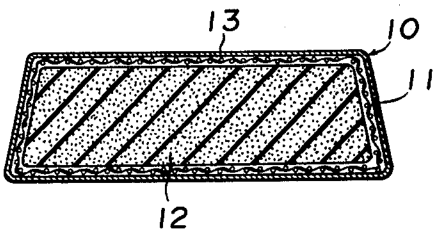
FIG. 2 is a cross-sectional view taken along the line II—II of FIG. 1.

The core 10 also includes a filling member 12 made of an open-cell foamed material such as polyurethane foam so as to be contractible, the filling member being accommodated within the core body 10 throughout the length thereof. The inner periphery of the hollow core body 11 is substantially equal to the outer periphery of the filling member 12 as shown in FIGS. 1 and 2.

The manner in which the core body 11 and the filling member 12 are combined together will be described. A plurality of sheets of canvas are stuck together by a suitable adhesive to provide the ply of which the core body is made. This ply of canvas is of such a width that the ply is wound around the filling member 12 with its opposite ends of edges bonded together by an adhesive to provide a continuous outer peripheral surface, as best shown in FIGS. 1 and 2. Preferably, the opposite edges of the ply have complementary oblique faces when cross-sectionally viewed in the longitudinal direction of the core body 11, the opposite edges being butt-jointed at these complementary faces. This not only enhances the binding of the opposite edges of the ply but also serves to provide a continuous, smooth surface at its outer periphery.

The core 10 further includes a covering member 13 covering the outer peripheral surface of the core body 11, the covering member being made of a film of plastics material such as polyethylene. The covering member 13 has a series of vent apertures 14 disposed on each of the top and bottom faces of the core body 11 and spaced along the length thereof, the vent apertures serving to allow the air, entrapped between the covering member 13 and the core body 11, to escape.

Figure 4:
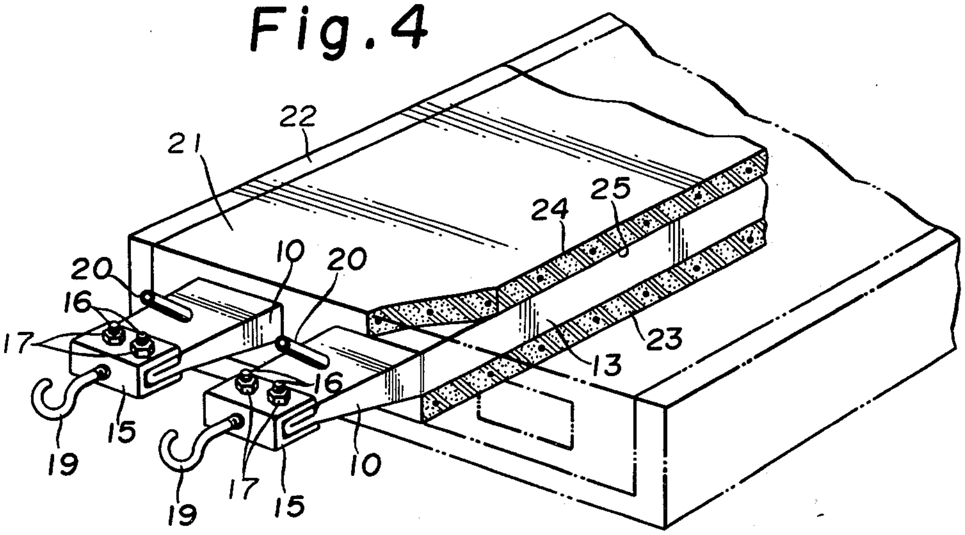
FIG. 4 is a fragmentary perspective view of a cast concrete slab employing the cores.
Figure 3A:
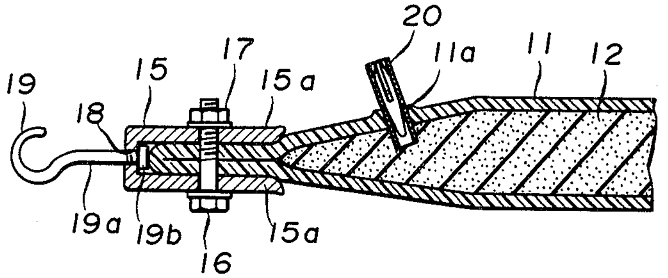
FIG. 3A is a longitudinal cross-sectional view through the core.

One end portion of the core body 11 is progressively reduced outwardly in thickness as best shown in FIGS. 3A and 4. A clamp member 15 of a channel-shaped cross-section, having a pair of arms **15*a*, 15*a* and a connecting portion 15*b* interconnecting the arms, is secured to the extremity of the reduced end portion by bolts 16 and nuts 17, the bolts passing through the arms 15*a*, 15*a* and the end of the core body 11. The clamp member 15 has an aperture 18 formed through the connecting portion 15*b***.

A hook member 19 is attached to the clamp member 15, the shank portion **19*a* being slightly loosely received in the aperture 18 so as to be rotatable about the axis thereof. The hook member 19 has an enlarged end 19*b* adjacent to the shank portion so that the hook member 19 is prevented from being disengaged from the clamp member 15**.

A tubular valve member 20 is attached to the valve body 11 adjacent to the clamp member 15 for applying a negative pressure to the interior of the core body 11 for purposes hereinafter more fully described. As shown in FIG. 3A, the valve member 20 is fitted in an opening **11*a* formed through the ply of the core body 11 and extends into the filling member 12**.

Preferrably, the covering member 13 is in the form of a film tube having an internal diameter substantially equal to the outer periphery of the core body 11.

As mentioned above, the filling member 12 is made of an open-cell foamed material, which means that the cells are interconnected. With this construction, when a selected degree of negative pressure is applied from a source of negative pressure (not shown) through the valve member 20 to the interior of the core body 11 within which the filling member 12 is accommodated, the filling member is evacuated to remove the air in the cells so that the core construction 10 is reduced in cross-section throughout the length thereof.

When the covering member 13 in the form of a tubular film is to be applied to the core body 11, the core 10 is first evacuated with its cross-section reduced substantially throughout the length thereof, and then the tubular film is fitted loosely over the thus cross-sectionally reduced core 10. Finally, the negative pressure is released from the core body 11 so that the core body is expanded to its original trapezoidal cross-section to thereby allow the tubular film to be positively fitted over the core body 11.

Figure 3B:
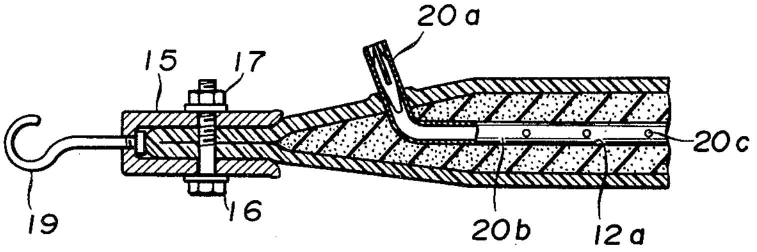
FIG. 3B is a view similar to FIG. 3A but showing a modified core.

The filling member 12 may be provided with a continuous aperture **12*a* extending along the length thereof at its center, as shown in FIG. 3B. In this embodiment, the valve member 20a has an integrally-formed elongated tubular portion 20b received in and extending along the central aperture 12a, the tubular portion 20b having a number of openings 20c formed therethrough and distributed over the circumferencial surface thereof. With this arrangement, the core 10** is effectively reduced in cross-section when subjected to a negative pressure.

The filling core 12 may also be formed with a plurality of continuous apertures 12a extending along the length thereof.

When a hollow concrete slab 21 is to be cast using a plurality of cores 10, concrete is first fed into a horizontally-disposed, open trough-like mold or casting bed 22 from a hopper (not shown) to form a first or bottom layer of concrete 23, the hopper being disposed above the mold 22 and being movable therealong. Then, three cores 10 are laid over the thus cast bottom layer 23 of concrete. As shown in FIG. 4, each core 10 projects exteriorly of the mold 22 through a respective opening in the end plate of the mold. Subsequently, concrete is poured over the cores 10 on the partly-cured bottom layer 23 from a second hopper (not shown) to form the concrete slab 21 so that the cores 10 are embedded in the cast concrete slab constituted by the bottom layer 23 and the top layer 24.

The core 10 comprising the body 13 and the filling member 12 is of a sufficiently rigid construction to withstand the load applied by the cast concrete. This ensures that the core 10 is protected against deformation when embedded in the cast concrete slab. Then, the concrete slab 21 is removed from the mold 22 after it has been cured.

For withdrawing each core 10 from the concrete slab, a pull is applied to the core by a suitable means through the hook member 19. Prior to this withdrawing operation, the valve member 20 is adjusted to enable communication between the interior of the core body 11 and the ambient atmosphere. During the withdrawal of the core 10, the air in the cells of the filling member 12 is expelled to a certain degree. The body 11 is covered with the covering member 13 made of plastics material and having a relatively low coefficient of friction. When the concrete slab 21 is cured, the covering member 13 tends to be bonded to the cured concrete surrounding it. When the core 10 is being withdrawn from the concrete slab 21 to provide a continuous hole 25 defined by the peripheral surface of the core 10, friction develops between the core body 11 and the covering member 13. This friction is relatively low, and this facilitates the withdrawal of the core 10 from the concrete slab 21. A wire brush (not shown) or the like is passed through the continuous hole 25 to remove the covering member 13 left in the hole.

Alternatively, when each core 10 is to be removed from the cast concrete slab 21, a selected degree of negative pressure is supplied to the interior of the core body 11 via the valve member 20 from the negative pressure source as described above for fitting the tubular covering member over the core body 11. In this case, the valve member 20 performs its normal function of maintaining negative pressure in the core body 11. The core 10 is thus evacuated with its cross-section reduced substantially throughout the length thereof. This much facilitates the removal of the core 10 from the cast concrete slab 21.

Although the core 10 has a trapezoidal cross-section, it may have any other cross-sectional shape such as round, triangular and other cross-sections.

The core 10 is of a flexible construction and can be wound around a drum for reuse. This is space-saving. Since the core body and filling member are durable in nature, the core can be repeatedly used for the casting operation.

The invention has been described in detail with particular reference to the preferred embodiments thereof, but it will be understood that variations and modifications can be effected within the spirit and scope of the invention.

What is claimed is:

1. A core for use in casing a long concrete slab for forming a continuous hole extending along its length, which core comprises a relatively rigid resilient elongated hollow body having closed opposite ends, said hollow body having an opening formed through a wall of said hollow body at one end thereof, and a contractible filling member made of an open-cell foamed material and filling said hollow body, said body being folded at one end thereof and enclosed by a channel member having a hook attached thereto, the channel member being secured to said core.

2. A core according to claim 1, further including a covering member made of a film of plastics material and covering said hollow body around its outer peripheral surface.

3. A core according to claim 1, in which said hollow body is made of a ply of canvas.

4. A core according to claim 1, in which said filling member has a continuous aperture extending along the length thereof at its center.

5. A core according to claim 1, in which said foamed material is a flexible foamed plastics material.

6. A core according to claim 1, further including a hook member secured to the end of said core body and a valve member fitted in said opening.

7. A core according to claim 1, having a trapezoidal cross-section.

8. A core according to claim 1, in which said covering member comprises a tube fitted over the outer peripheral surface of said hollow body.

* * * * *